(12) United States Patent
Koa et al.

(10) Patent No.: US 6,412,852 B1
(45) Date of Patent: Jul. 2, 2002

(54) WATER, DUST AND SOUND ATTENUATING BARRIER AND TRIM PANEL MODULE AND METHOD FOR ASSEMBLING WITHIN A VEHICLE DOOR

(75) Inventors: Chi Hong Koa, West Bloomfield, MI (US); Imad F. Bazzi, Rochester Hills, MI (US); Mary K. Felstead, Courtice (CA); Elizabeth A. Hochey Merritt, Warren, MI (US)

(73) Assignees: Foamade Industries, Inc., Auburn Hills; General Motors Corporation, Detroit, both of MI (US)

( * ) Notice: Subject to any disclaimer, the term of this patent is extended or adjusted under 35 U.S.C. 154(b) by 0 days.

(21) Appl. No.: 09/625,302

(22) Filed: Jul. 25, 2000

(51) Int. Cl.[7] ............................. B60R 13/02; E04B 1/82
(52) U.S. Cl. ............................. 296/146.7; 296/146.5; 296/39.1
(58) Field of Search ............................. 296/146.5, 39.1, 296/146.7

(56) References Cited

U.S. PATENT DOCUMENTS

| | | | | |
|---|---|---|---|---|
| 4,588,627 A | * | 5/1986 | Isaksen et al. ................ | 428/80 |
| 4,848,829 A | * | 7/1989 | Kidd .......................... | 296/152 |
| 5,322,722 A | * | 6/1994 | Rozenberg ................... | 428/40 |
| 5,456,513 A | * | 10/1995 | Schmidt ...................... | 296/39.1 |
| 5,462,482 A | * | 10/1995 | Grimes ........................ | 454/143 |
| 5,482,343 A | * | 1/1996 | Bradac ........................ | 296/39.1 |
| 5,584,144 A | * | 12/1996 | Hisano ........................ | 49/502 |
| 5,688,015 A | * | 11/1997 | Patterson et al. ............ | 296/39.1 |
| 6,076,882 A | * | 6/2000 | Szerdahelyi et al. ......... | 296/146.1 |
| 6,142,556 A | * | 11/2000 | Tanaka et al. ............... | 296/146.7 |
| 6,158,789 A | * | 12/2000 | Fett et al. .................... | 292/346 |
| 6,197,403 B1 | * | 3/2001 | Brown et al. ................ | 428/137 |

* cited by examiner

Primary Examiner—Stephen T. Gordon
Assistant Examiner—Greg Blankenship
(74) Attorney, Agent, or Firm—Harness, Dickey & Pierce, P.L.C.

(57) ABSTRACT

A water and sound attenuating barrier for positioning between the interior surface of a vehicle door exterior panel and the door interior trim panel. The barrier is formed of a sheet of semi-rigid material having an inner face and an outer face. A thick layer of sound attenuating material is bonded to the sheet inner face and pressure sensitive adhesive is applied upon the sheet outer face. The sheet and trim panel are fastened together with the layer against the trim panel and with the adhesive bearing face exposed, to form a unitary module. To assemble the module with the door panel, the module exposed face is pressed against the door panel interior surface for securing the adhesive on the sheet outer face thereto. Mechanical fasteners removeably secure the sheet and the trim panel together and, also, secure the trim panel to the door panel during the assembly.

16 Claims, 3 Drawing Sheets

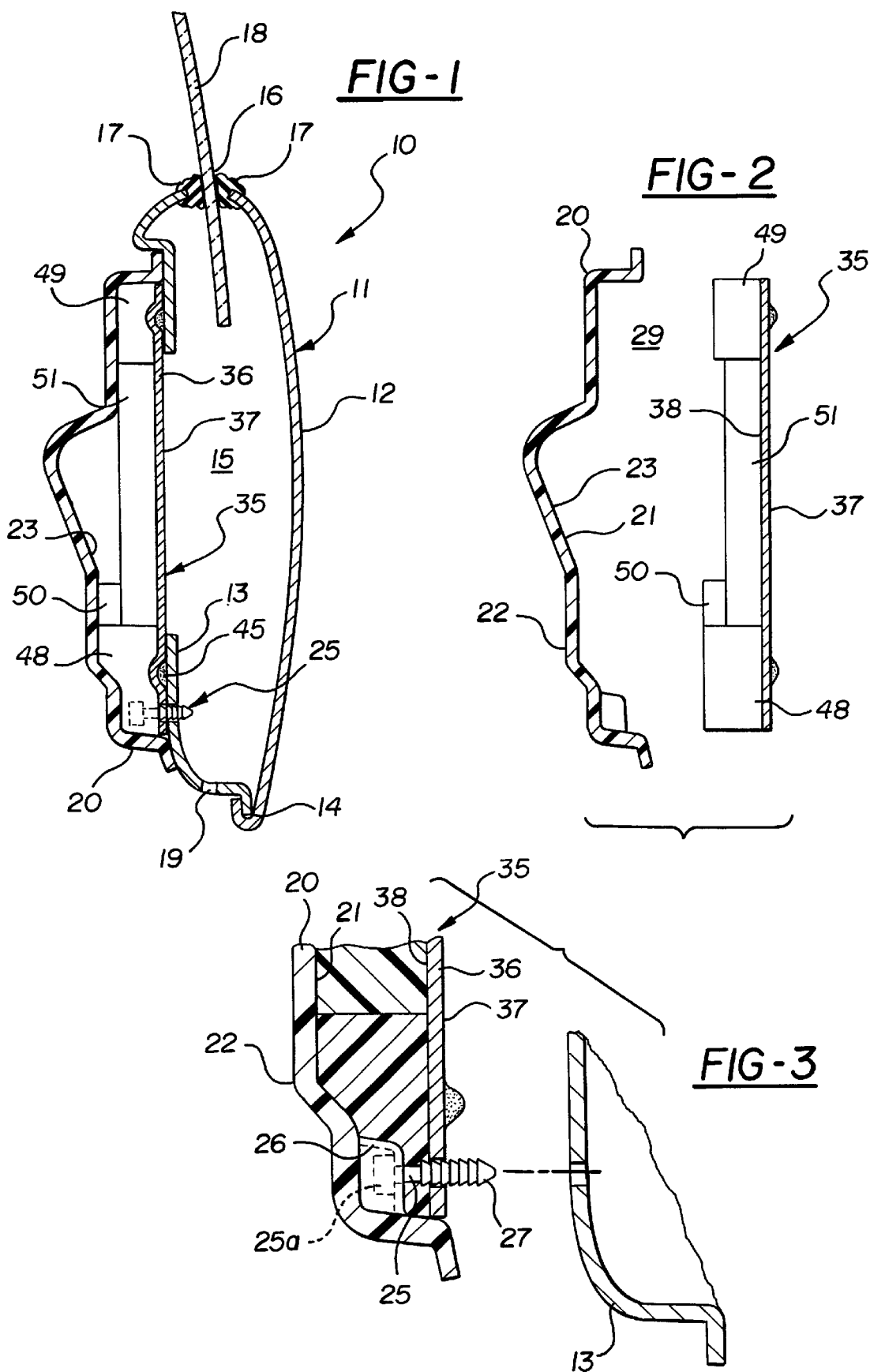

WATER, DUST AND SOUND ATTENUATING BARRIER AND TRIM PANEL MODULE AND METHOD FOR ASSEMBLING WITHIN A VEHICLE DOOR

This invention relates to the formation of a modular trim panel and water, dust and sound barrier which may be assembled as a combined unit with a conventional exterior panel component of a vehicle door. The module is pre-assembled and then may be transported to the door assembly site for rapid attachment to the vehicle door exterior panel into which other door components, such as a window, window regulator, lock mechanisms, etc. may have been installed.

BACKGROUND OF INVENTION

A door for a automotive vehicle typically comprises an exterior panel which is formed of an outer, generally curved, exterior sheet of metal or plastic. The exterior panel conforms to the exterior surface of the body of the vehicle. An inner surface is formed on the panel by a metal sheet whose edges are peripherally secured to the outer sheet. The inner sheet, typically, is formed with a large central opening for access to a cavity provided between the sheets within the exterior door panel. A slot is formed at the upper edges of the two sheets for receiving a sheet of glass. The glass sheet may be lowered into the cavity between the sheets for opening the window, or it may be raised upwardly for closing the window. Alternatively, the glass may be immovably fixed in the window opening with only its lower portion extending downwardly towards the cavity.

Usually, various door components are positioned within the cavity. These components may include a window regulator mechanism for manually raising and lowering the window or, a powered mechanism for raising and lowering the window by an electrical motor and drive system, and locking mechanisms for the door, door handle components, side view mirror attachment and adjustment components, etc.

After the exterior door panel is assembled with its various internal components, it is common to cover its interior surface that is, the inner sheet exposed inner surface, with a trim panel. The trim panel usually is made of plastic sheet material that is of a size and shape to overlap and cover the interior surface of the exterior door panel. The trim panel may be formed of a thermoplastic material or a cloth type of material or a combination of both materials. Typically, the trim panel is molded or otherwise formed with a contoured or irregular surface that includes depressions, bosses, curved areas and other such surface irregularities. Such irregularities are commonly used for design or appearance purposes or for receiving and accommodating door components. For example, door components such as interior lock controls, controls for operating a motor powered raising and lowering mechanism for the window, radio speakers and arm rests. Usually the peripheral edge of the trim panel is secured to the interior surface of the door panel by mechanical fasteners that can be disengaged so that the trim panel may be manually removed for providing access to the door components located within the cavity of the exterior door panel or located within the depressions or spaces formed in the trim panel.

When the door panel includes a moveable window which may be raised up or lowered, sealing strips or gaskets are typically used to seal against the window and prevent water, that is, rain water, wash water or melted snow, or ice from entering the slot within which the window is arranged. Such water would otherwise flow into the cavities or spaces in the exterior door panel or the trim panel. However, such seals or gaskets sometimes leak because of surface wear or irregularities caused by movements of the window glass or by weathering due to changes in temperature and in sunlight. To enable that water to escape from the door, it is common to provide drain holes at the lower edge of the exterior panel. However, it is also necessary to protect the trim panel, and the devices mounted on the trim panel, from water which enters into the door. Hence, it is common to provide a water barrier between the interior surface of the door panel and the trim panel outer surface which is adjacent the door panel interior surface. The water barrier or water shield commonly is formed of a relatively thin flexible, water impervious, plastic sheet which is cut to the size and shape necessary for covering the respective surfaces. Usually the sheet is adhered to one or both of the adjacent door panels or trim panel surfaces. Typically, pressure sensitive adhesive is applied upon the peripheral edge portions of the water shield sheet so that the sheet may be pressed against and, therefore, adhered to the interior surface of the door panel before the trim panel is applied over it and secured to the door panel.

Because conventional water shields are formed of large size, flexible sheet plastic, they are awkward to handle and to apply on a vehicle as the vehicle moves along an assembly line. The steps of accurately positioning and fastening the shield upon the interior surface of the door panel take time and care.

In addition to the water shield or sheet, sound absorbing stuffing is commonly used within the vehicle door to attenuate noise. Such stuffing is usually applied within the trim panel. Typically, this stuffing comprises shoddy cotton or non-woven thick padding which may be cut and shaped into pieces that fit into the trim panel depressions or spaces or surface irregularities. In addition, sometimes thicker pieces of foam plastic material may be inserted within the spaces or depressions in the trim panel. The purpose of the stuffing is to reduce noise transmission through the door. In some doors, depending upon the size, shape and quality of the door panel, it may be desirable to use both the non-woven padding and the thicker foam plastic. The padding could be used for relatively shallow spaces, for example, an inch or less in depth and, foam plastic pieces or pre-formed plastic blocks can be used in deeper spaces or depressions. Positioning the stuffing requires manual placement. An adhesive material may be used for securing the stuffing pieces in the proper positions within the trim panel.

It would be desirable to have available a system for rapidly and conveniently putting together the door panel, the trim panel, the water shield and the sound attenuating stuffings with minimum labor and in a way that permits the trim panel and the water shield to be easily removed for access to the components mounted within the door. Thus, the present invention is concerned with the provision of a preassembled module which contains the trim panel and the water shield, and the sound attenuating stuffings which may, in addition, serve as dust barriers. Also, the invention provides a simplified way of rapidly attaching the module to the door exterior panel on an assembly line while permitting later separation of the parts for access to the interior spaces in the door.

SUMMARY OF INVENTION

This invention contemplates the provision of an unitary module formed of an interior door trim panel, a water barrier connected to the panel and sound attenuating stuffing fitted within the trim panel. The barrier is formed of a sheet of water resistant plastic material. A bead of pressure sensitive adhesive is applied upon the exposed face of the sheet. Thus, the module may be pressed against the interior surface of a previously formed vehicle door outer panel to adhere the module to the door panel. The barrier sheet may be secured to the trim by means of mechanical fasteners which also fasten the trim panel to the exterior panel when the module is pressed into engagement with the interior surface of the exterior door panel.

Preferably, the barrier sheet is provided with a fold or hinge line so that the barrier sheet upper portion may be folded inwardly of the vehicle, away from the exterior door panel, if and when the interior trim panel is removed. In that event, the barrier sheet has a lower portion which remains in adhesive engagement with the exterior door panel after the trim panel is removed. That permits access to the interior of the door panel which conventionally is formed with a cavity or space within which door components, such as a glass window, a window raising and lowering mechanism, door locks, etc. are conventionally mounted.

The module arrangement permits pre-assembly of the module components at a remote location. The barrier component functions to prevent water from getting to the trim panel and, also, carries the stuffing. Thus, assembling the barrier upon the trim panel simultaneously positions the sound attenuating padding and foam plastic pieces within the trim panel and provides the exposed, adhesive bearing surface for pressure adherence to the exterior door panel. In addition, the non-woven, noise attenuating padding may be formed of a fibrous material which tends to catch or filter fine dust particles that might enter the door. This protects against fine dust particles entering the door and then moving around the trim panel into the vehicle passenger compartment. The assembled module may be stored until needed and may be transported to the door assembly site.

The exterior door panel may be formed of stamped metal sheets that are preassembled with its door components at a different site. Thus, the unitary module and the unitary exterior door panel may be brought together for assembly when and where desired. Such assembly can occur at a location remote from the final assembly of the vehicle so that the completely assembled door may be brought to the vehicle assembly line for connection to the vehicle body. Alternatively, the assembly of the complete door may be accomplished on the vehicle assembly line or location where the vehicle is finally assembled. In either event, the pre-assembly of the module substantially reduces the amount of time needed for assembly of the complete door. This is particularly useful at the site of a vehicle final assembly line.

An object of this invention is to provide, with minimal time, labor and expense, a pre-assembled module comprising the interior trim panel, water, dust and sound barrier, and means for fastening the module to the exterior sheet metal door panel so that the module may be formed at one site and accurately and rapidly assembled into the vehicle at a remote assembly site.

A further object of this invention is to provide a water barrier for assembly within a vehicle door between the trim panel and the exterior door panel, which barrier also provides a means for attenuation of sound passing through the completed door and, to some extent, also provides a dust filter with the vehicle door.

Still a further object of this invention is to provide a pre-assembled unitary vehicle door module comprising an interior trim panel and a water and sound attenuation barrier which may be manually, quickly and easily assembled within the vehicle door and which may be removable or partially removable for providing access to components which may be located within the vehicle door.

These and other objects and advantages of this invention will be come apparent upon reading the following description of which the attached drawings form a part.

DESCRIPTION OF DRAWINGS

FIG. 1 is a schematic, cross-sectional view of a vehicle door with the trim panel and barrier module mounted upon the exterior door panel.

FIG. 2 is a cross-sectional, schematic view showing the trim panel separated from and next to the barrier.

FIG. 3 is an enlarged, cross-sectional, schematic, fragmentary view showing a mechanical fastener on the module positioned to interlock with the exterior door panel.

DETAILED DESCRIPTION

Figure 4:
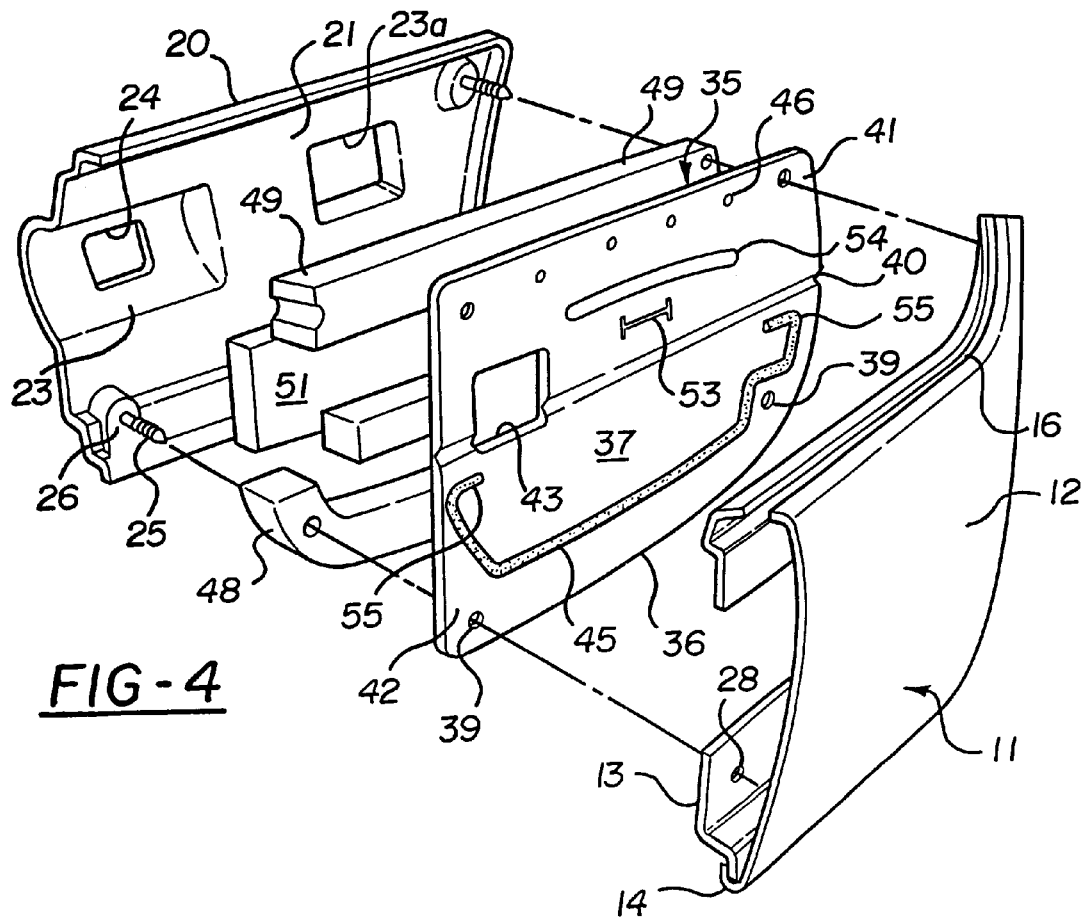
FIG. 4 is a schematic, cross-sectional, perspective view showing the trim panel, the barrier sheet, the sound attenuation filler material and the exterior door panel separated.
Figure 5:
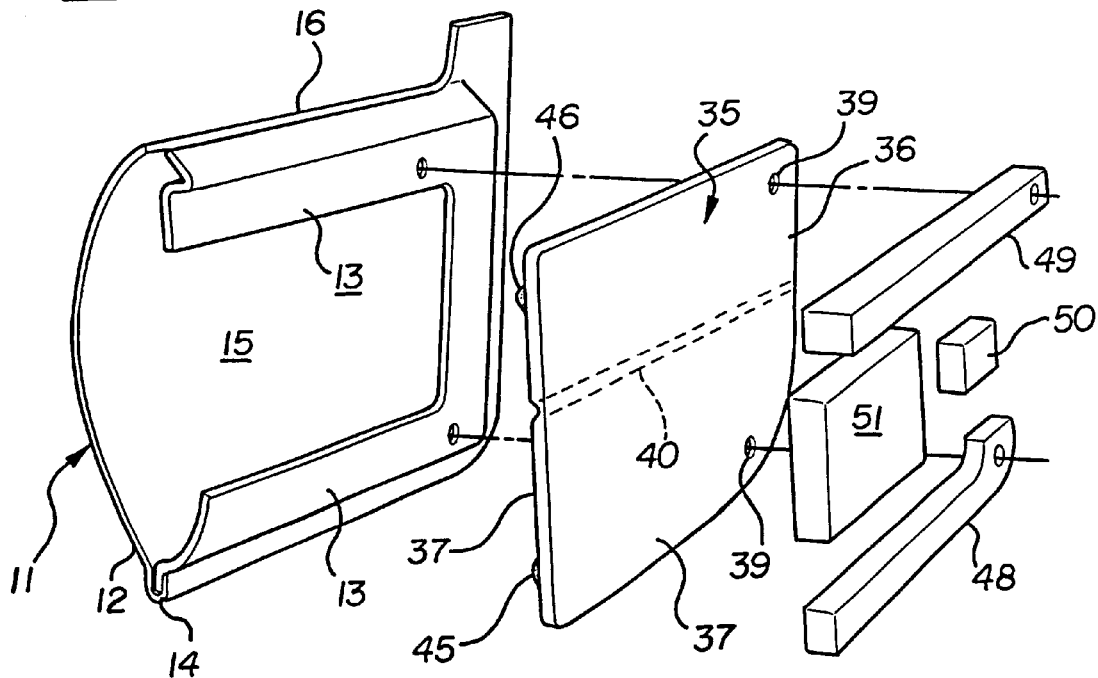
FIG. 5 is a cross-sectional, schematic, perspective view illustrating the barrier sheet aligned for mounting upon the interior surface of the door panel and with the sound attenuating material shown separated from the sheet.
Figure 6:
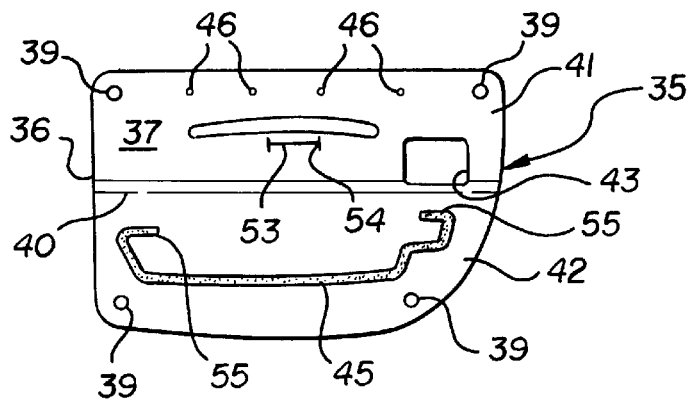
FIG. 6 is an elevational view, to a reduced scale, of the outer face of the barrier sheet.
Figure 7:
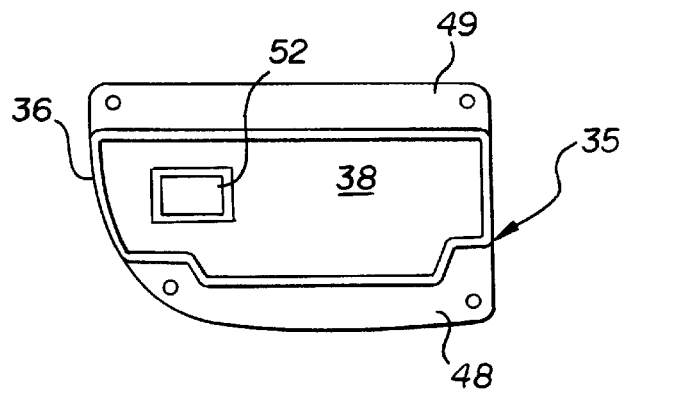
FIG. 7 is an elevational view, to a reduced scale, of the inner face of the barrier sheet with the sound attenuation material mounted thereon.

A representative or typical vehicle door 10 is illustrated in schematic, cross-section in FIG. 1. A door is formed of an exterior, metal door panel 11 made of an outer shell 12 which forms the exterior surface of the vehicle door, and an interior shell 13, formed of stamped sheet metal and secured to the outer shell. Typically, the outer shell and inner shell of the door panel are fastened together by crimping the edge of the outer shell around the inner shell edge and welding the two together to form a seam 14. Thus, the inner shell 13 forms an interior surface for the metal door panel. The seam or connection 14 between the two shells is shown schematically in FIG. 4. When the two shells are secured together, a cavity 15 is provided between them. The upper edge of the cavity is gapped to form an upper edge slot 16 whose side edges are covered with suitable resilient edge beads 17. A glass sheet 18 fits within the slot. Typically the glass sheet is arranged to slide up and down within the slot in response to a mechanical or mechanical-electrical mechanism (not shown) located within the cavity 15. The description given above in general applies to a typical automotive vehicle door.

Since it is possible for water to seep into the cavity 15, around the glass sheet through the slot 16, it is common to provide drain or weep holes 19 at the lower edge of the exterior door panel. This schematically shows a conventional construction.

Typically, an interior trim panel 20 is arranged on the interior surface of the door panel. Conventionally, trim panels are made of either a molded, or thermoformed, plastic sheet or a composite plastic and cloth material or even a plastic or wood or metal sheet covered with cloth material. Thus, the interior trim panel 20 is shown schematically.

Normally, the trim panel has an outer surface 21 which is the surface that faces towards the outside of the vehicle. In addition, its inner surface 22, which is the surface that faces towards the interior of the vehicle, is exposed and carries upon it some parts of the operating mechanism (not shown) for the door. For example, door lock control switches and vehicle window regulator control switches, for raising and lowering the window, and door opening handles may be mounted on the inner surface 22, while other portions of those components may be mounted upon the outer surface 21.

The trim panel typically is provided with irregular surfaces which have bends, depressions 23 and 23a and at least one opening 24 for the mounting of the door controls. The irregularity of the surfaces 21 and 22 vary from vehicle to vehicle.

The trim panel is normally connected to the inner surface of the exterior door panel, that is, to the inner surface formed by the shell 13. For that purpose, mechanical fasteners are typically used. Thus, fastener members 25 are schematically illustrated. These may be in the form of so called "Christmas Tree" fasteners which consist of a stud portion having a head 25a fitted within a molded boss 26 formed on the outer surface of the trim panel, and springy leg extensions 27 which fit into cooperating fastener holes 28 in the shell 13. The irregularities and bends and depressions in the interior trim provide an interior cavity or space 29 for holding mechanical controls or door mounted devices, such as radio speakers, locks or window switches and the like.

Because water may seep into the interior of the door, it is desirable to shield the trim panel from the water. The trim panel, particularly if it is provided with cloth portions, may be vulnerable to water. Moreover, the water may seep into the vehicle. Therefore, it is conventional to utilize a water shield which is arranged between the trim panel and the exterior door panel. The water shield, which is also referred to as a barrier panel 35, is formed of a semi-rigid or flexible plastic sheet 36, preferably made of a water impervious thermoplastic, heat resistant material. The particular material may be selected by those skilled in the art as commercially available types of material suitable for this purpose are known.

The barrier panel sheet 36 has an outer surface 37 which is arranged toward the exterior door panel, and in an inner face 38 which is arranged towards the trim panel. The sheet may be provided with holes 39 through which the mechanical fasteners 25 extend for engaging with the holes 28 in the exterior door panel. The barrier panel sheet is also provided with a weakened or indented bend or fold line 40 which serves as a hinge for bending the upper sheet portion 41 downwardly out of the plane of the lower portion 42 of the sheet. Also, pockets or depressions 43 may be formed in the sheet for enveloping portions of devices installed in the interior door 20 panel.

The barrier panel sheet 36 is initially assembled and fastened to the trim panel by the fastener members 25 which extend through the fastener receiving holes 39 formed at the appropriate locations in the sheet. Thus, the trim panel and the barrier panel 35, together, form a unitary module which may be assembled at a particular location and then transported to a different location for assembly, as a unit, to the exterior door panel which, by that time, may have its respective hardware, glass, inserted elements, etc., installed within its cavity.

To install or assemble the module upon the exterior door panel, the outer face of the barrier sheet 36 is provided with a substantially continuous, pressure sensitive adhesive stripe or bead 45. In addition, individual spots or dabs of adhesive 46 is applied upon the upper edge of the upper part 41 of the sheet. The adhesive stripe and the spots may be covered with a strip of release paper to protect them from adhering to other surfaces until the sheet is ready to be applied against the exterior door panel. At that time the release paper may be manually removed to expose the adhesive spots and adhesive stripe for adhering to the door panel interior surface 13.

The sheet 36 is provided, on its inner surface, with sound attenuating material which will be located between the sheet and the outer surface of the interior trim panel. The sound attenuating material may vary in size, shape and nature of material. Thus, the material is schematically indicated as lower strips of compressible foam plastic 48, upper pieces or strips 49 which may be a single strip or several strips arranged adjacent each other, and separate blocks of foam plastic 50 which may be located in places where the depressions in the surface of the trim panel are substantial, for example, several inches deep. These blocks 50 may be located upon the inner surface 38 of the sheet, along with the strips 48 and pieces 49, and may be adhesively bonded to the sheet.

In addition, a thick pad or layer of non-woven padding material 51 may be arranged upon and adhesively bonded to the inner surface 38 of the sheet 36. Preferably, the pad would be thick enough, for example, one inch in thickness, to accommodate to the more shallow, for example, one inch or less deep, depressions or irregularities of the outer surface of the trim panel. Where appropriate, portions of the pad or layer are compressed, as shown at 52 to overlay trim mounted components or pockets 43 formed in the sheet 36, to accommodate items that are positioned within the trim panel. Such items may include radio loud speakers or window control members, etc., or the foam plastic filler blocks 50. Also, slits 53 may be cut in the sheet 36, where needed for the passage of wires or other parts of the components arranged within the outer door panel.

The non-woven padding material, which is a conventional type of material used for sound insulation within various portions of an automotive vehicle, such as on the interior surface of the vehicle hood or trunk lid or within the headliner, etc., is formed of intertwined natural or synthetic fibers which make a thick padding. That padding serves to attenuate sound or noise. In addition, the padding also serves as a dust filter within the vehicle door. Fine dust particles which sometimes enter the interior of a door would be entrapped in the padding. That protects the different mechanical and electrical components positioned within the door and traps dust to keep the interior of the vehicle clean.

As can be seen, the trim panel and the sheet, upon whose inner surface the padding or layer of non-woven material and the strips of foam plastic and the foam plastic blocks are attached, form the complete pre-assembled module. The module also may contain the various units of electrical or mechanical items that are normally arranged within the trim panel. In addition, a water divertor bead 54 that extends outwardly of the sheet 36, may be formed upon the outer surface 37 of the sheet to deflect water moisture that may seep into the door through the window slot. For that purpose, the end portions 55 of the adhesive stripe 45 may be bent around to likewise form moisture directing beads on the outer surface of the sheet. The bent end portions 55 also better secure the sheet 36 to the outer door panel.

Preferably the padding and the foam plastic material, which may be made of commonly available foam plastic such as polyurethane or the like, are resiliently compressible. Thus, when the module is manually pressed against the interior surface of the exterior door panel for adhering the module to the interior surface, the foam plastic and the padding become resiliently compressed between the trim panel 28 and the sheet 35. Thus, they exert a force against the inner surface 38 of the sheet. That force presses the stripe of adhesive 42 and the adhesive dab 46 against the interior surface of the door panel. Hence, the module is securely fastened to the door panel by the stripe of adhesive, the dabs of adhesive along the upper edge of the sheet and the mechanical fasteners 25.

Figure 8:
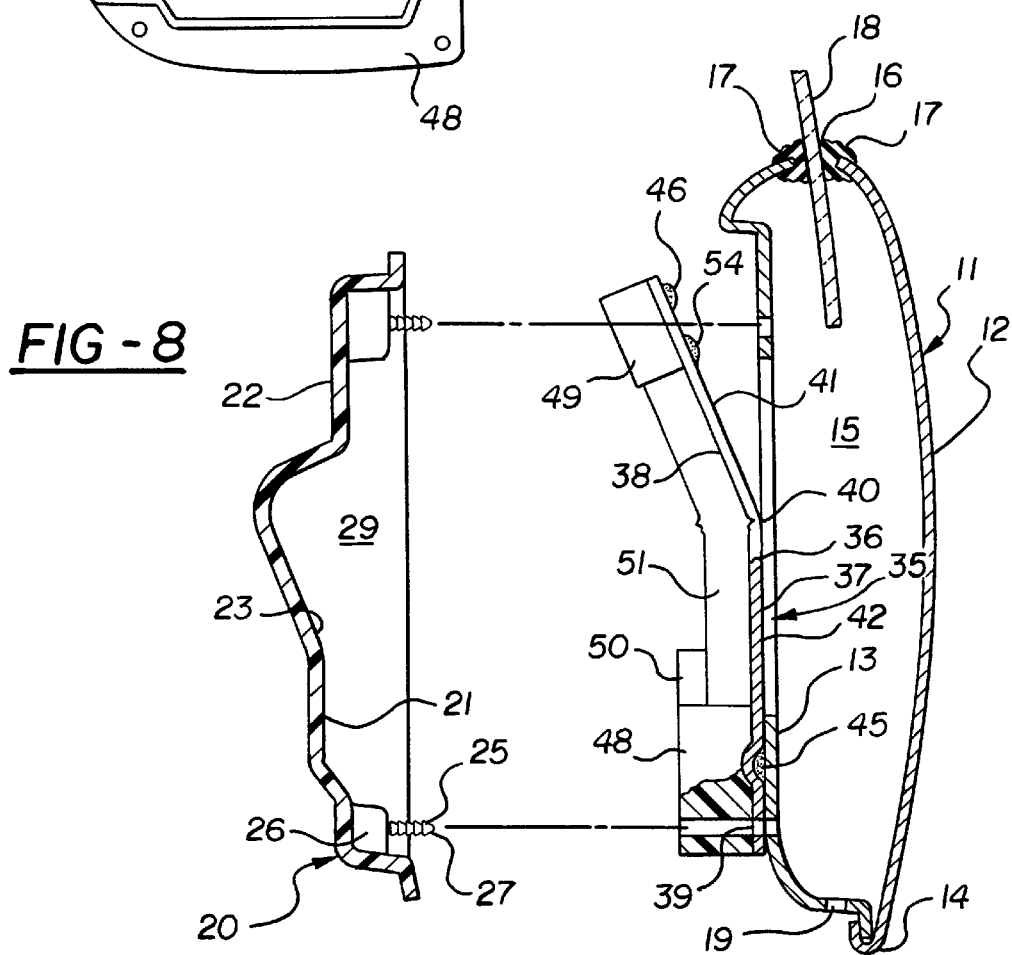
FIG. 8 is a cross-sectional, schematic view of a disassembled door with the trim panel moved towards the interior of the vehicle and disconnected from the exterior door panel and the barrier upper portion bent away from the interior surface of the door panel to provide access to the space within the exterior door panel.

In the event that it is necessary to have access to the interior of the door, such as to service the elements mounted therein or to replace broken glass, the trim panel may be removed, by manually pulling it away from the exterior door panel. For this purpose a screw driver or similar tool may be inserted between the edges of the barrier panel and the exterior door panel to pry them apart. When the fasteners are released from the cooperating holes in the exterior door panel and the trim panel is pulled inwardly of the exterior door panel, the barrier sheet will still remain over and upon the interior surface of the door panel due to the adhesive connection. Then, the service mechanic may manually pull the upper portion 41 of the sheet 36 inwardly of the vehicle to bend it down along the hinge bend line 40, as illustrated in FIG. 8. The bent adhesive bead end portions help to prevent the force of folding the sheet upper portion 41 from also continuing downwardly to pull the adhesive bead 45 free from the interior surface of the outer door panel.

Folding the sheet upper portion downwardly permits access to the cavity of the exterior door panel, while still leaving the rest of the barrier panel in place. After access is no longer needed, the upper portion of the barrier panel may be swung upwardly so that its spots or dabs of adhesive re-engage the interior surface of the door panel. Then the trim panel may be manually replaced by inserting the fastener members through the holes in the barrier sheet and through the interior surface of the door panel.

The assembly of the complete door on a vehicle assembly line can be accomplished by pre-assembling the module comprising the interior trim panel and barrier sheet with the sound attenuating material and, with the various elements normally mounted within the trim panel. Similarly, the external door panel with the glass and various devices located in that panel, may be pre-assembled. Later, the module may be rapidly assembled upon the exterior door panel by simply pressing it against the interior surface of the door panel so that the adhesive on the barrier sheet engages and secures the module to the door panel while the fastener members simultaneously engage the cooperating fastener holes for mechanically fastening the module to the door panel. This permits fast assembly and eliminates the relatively difficult task of manually positioning and fastening a water shield panel in its precisely required location within the door. The module arrangement automatically positions the water shield-sound attenuating barrier panel correctly for assembly without separate measurement or manual attempts to accurately locate the parts for fitting together during assembly.

This invention may be further developed within the scope of the following claims. Accordingly, it is desired that the foregoing description be read as merely descriptive of an operative embodiment of this invention and not in a strictly limiting sense. Having fully described an operative, preferred embodiment, I now claim:

What is claim is:

1. A method of assembling a water and sound attenuation shield within a vehicle door formed of an exterior, rigid door panel having an exterior surface and a spaced apart interior surface and an inner trim panel which covers, and has an outer face that overlaps, the interior surface of the door panel, comprising the steps of:

forming a sheet of water repellant material, with the sheet having an inner and outer face, to a size and shape to overlap and to fit between the door panel interior surface and the trim panel outer face;

providing a pressure sensitive adhesive material upon the outer face of the sheet;

attaching the sheet to the trim panel with the sheet inner face adjacent the trim panel outer face to form a module;

pressing the module against the interior surface of the door panel to engage the adhesive material on the sheet outer face against the interior surface of the door panel for connecting the module to the door panel;

and additionally connecting the trim panel to the door panel by mechanical fasteners adapted to be disconnected so that the trim panel being adapted to be removed from the door panel when desired while leaving the sheet still connected to the door panel.

2. A method as defined in claim 1, and including attaching a relatively thick layer of sound attenuating material upon the inner face of the sheet so that the layer is arranged between the sheet and the trim panel when the sheet is attached to the trim panel.

3. A method as defined in claim 1, and forming depressions and irregularities in the trim panel;

bonding a thick layer of a sound attenuating material, at least a portion of which is relatively compressible resiliently, upon the inner face of the sheet for fitting the layer within the depressions and irregularities of the trim panel;

whereby the layer forms a sound attenuating barrier and the resilient portion thereof normally exerts a force to press the adhesive located upon the outer face of the sheet against the interior surface of the door panel when the module is fastened thereto.

4. A method as defined in claim 1, and including forming the sheet into an upper portion and a lower portion by providing a weakened hinge line in the sheet so that the upper portion being adapted to bend about the hinge line;

providing a smaller amount of adhesive on the sheet upper portion as compared to the sheet lower portion, for engaging the interior surface of the door panel;

the sheet upper portion being more easily disengaged from the door panel interior surface manually;

whereby after the module is assembled to the door panel, the trim panel being adapted to be removed from the door panel when desired and the sheet upper portion being adapted to be manually disengaged from the interior surface of the door panel by manually pulling it to release the adhesive thereon and adapted to be bent downwardly for exposing and providing access to the space between the door panel exterior and interior surfaces.

5. A vehicle door interior module formed of an assembled, interior trim panel and a water and sound barrier sheet for mounting upon the interior surface of a rigid vehicle door exterior panel that is formed with an exterior surface and an interior surface, comprising:

an interior trim panel having an inner face and an outer face shaped to cover, with its outer face adjacent to, the interior surface of the vehicle door panel;

a semi-rigid, substantially flat barrier sheet adapted to be normally arranged between the trim panel and the door panel interior surface, said sheet having an inner face overlapping the outer face of said trim panel, and an outer face shaped to overlap and cover the interior surface of the door panel;

a layer of a water resistant and sound attenuation material secured to the inner face of the sheet;

fastening members securing the sheet and the trim panel together, with said layer arranged between the sheet and the trim panel;

a pressure sensitive adhesive arranged upon the outer face of the sheet;

whereby the module being adapted to be manually applied upon the rigid vehicle door exterior panel for assembling a vehicle door by positioning the module relative to the interior surface of, and pressing the module against, the rigid vehicle door exterior panel for adhering the sheet, with the trim panel, to the rigid vehicle door exterior panel.

6. A vehicle door interior module as defined in claim 5, and said trim panel having irregularly located depressions and raised portions to form space areas between the sheet and the trim panel;

and said layer being arranged to fit within said space areas.

7. A vehicle door interior module as defined in claim 6, including at least a portion of said layer being resiliently compressible between the trim panel and sheet;

whereby the resiliently compressible portions of the layer continually press the sheet, and thereby, the adhesive located upon the outer surface of the sheet, against the interior surface of the door panel when the module is assembled thereto and the trim panel is mechanically fastened thereto.

8. A construction as defined in claim 7, and including mechanical fastening members arranged to releasably connect the sheet to the trim panel and for engaging cooperating fastening elements formed on the door panel for connecting the trim panel to the door panel interior surface when the module is pressed against the door panel.

9. A construction as defined in claim 6 and said sheet having a bend line formed across it to form the sheet into an upper portion and a lower portion, whereby the upper portion being adapted to be bent away from the lower portion and the door panel interior surface when desired by manually releasing the adhesive material securing the sheet upper portion to the door panel interior surface.

10. A construction as defined in claim 9, and wherein an amount of the adhesive securing the lower portion of the sheet to the exterior surface of the door panel is considerably greater than an amount of adhesive securing the upper portion to the door panel interior surface so that the upper portion being adapted to be manually pulled free of the door panel exterior surface without simultaneously pulling the lower portion free therefrom and, thereby, to gain access to the door panel area which would otherwise been covered by the sheet upper portion.

11. A construction as defined in claim 9 and wherein the sheet has a lower portion and an upper portion divided by a weakened hinge line, so that the upper portion adapted to be bent relative to the lower portion;

and with the adhesive applied in a substantially continuous line along the peripheral edge of the lower portion for engaging the door panel interior surface, and in isolated spots along the peripheral edge of the upper portion of the sheet, so that the upper portion may be manually, relatively easily pulled apart from the vehicle door panel interior surface and bent downwardly while the lower portion remains adhesively secured to the door panel.

12. A water and sound attenuation barrier for installation within the interior of a vehicle door having an exterior door panel formed within an interior and exterior surface, and a trim panel having an outer surface shaped to overlap and cover the interior surface of the exterior door panel, comprising:

a semi-rigid barrier sheet adapted to fit between the trim panel and the door panel interior surface and shaped to cover at least a portion of the trim panel outer surface, with the barrier sheet having an inner face and an outer face;

said sheet outer face being adapted to contact the interior surface of the door panel, and the sheet inner face being adapted to be arranged face to face with the trim panel exterior surface;

said sheet being formed of a water resistant material and having a layer of a water resistant and sound attenuation material affixed upon the inner face of the sheet for engaging and conforming to the outer surface of the trim panel;

and pressure sensitive adhesive material applied upon the outer face of the sheet for adhesively engaging the interior surface of the door panel.

13. A water and sound attenuation barrier as set forth in claim 12 and said layer material being formed of a non-woven fabric padding shaped to fit within depressions and irregularities formed in the outer surface of the trim panel for attenuating sound through the trim panel.

14. A water and sound attenuation barrier as defined claim 12, and including connector members formed on the barrier for interconnecting the barrier to the trim panel so as to form a barrier and trim panel unitary module adapted to be stored and handled as a unit and applied together upon the interior surface of a door panel by pressing the module against the interior surface of the door panel so as to adhesively bond the module thereto.

15. A water and sound attenuating barriers as defined in claim 14, and said layers being shaped to fit into and to substantially fill irregularities and depressions formed in the outer surface of the trim panel and for providing a sound attenuating filling between the barrier and the trim panel.

16. A construction as defined in claim 15, and at least a portion of the material forming said layer being resilient under compression;

and said connector members normally connecting the barrier to the trim panel and, in addition, connecting the module trim panel to the interior surface of the door panel, whereby the layer tends to press the interior of the sheet and the adhesive material thereon against the interior surface of the door panel when the module is secured to the door panel.

* * * * *

UNITED STATES PATENT AND TRADEMARK OFFICE
Certificate

Patent No. 6,412,852 B1                                Patented: July 2, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Chi Hong Koa, West Bloomfield, MI; Imad F. Bazzi, Rochester Hills, MI; Mary K. Felstead, Courtice, Canada; Elizabeth A. Hochey Merritt, Warren, MI, and Paul A. Jackson, Troy, MI.

Signed and Sealed this Sixteenth Day of November 2004.

D. GLENN DAYOAN
*Supervisory Patent Examiner*
Art Unit 3612